(12) United States Patent
Donaldson et al.

(10) Patent No.: US 10,882,289 B2
(45) Date of Patent: Jan. 5, 2021

(54) BARRIER FILM SUBSTRATE, METHOD OF MAKING SAME, AND USE THEREOF

(71) Applicant: Engineered Materials, Inc., Buffalo Grove, IL (US)

(72) Inventors: Keith W. Donaldson, Buffalo Grove, IL (US); Marshall Grove, Yakima, WA (US); Joe Marks, Erie, CO (US)

(73) Assignee: Engineered Materials, Inc., Buffalo Grove, IL (US)

( * ) Notice: Subject to any disclaimer, the term of this patent is extended or adjusted under 35 U.S.C. 154(b) by 185 days.

(21) Appl. No.: 16/103,703

(22) Filed: Aug. 14, 2018

(65) Prior Publication Data

US 2019/0047269 A1    Feb. 14, 2019

Related U.S. Application Data

(60) Provisional application No. 62/545,416, filed on Aug. 14, 2017.

(51) Int. Cl.
| | | |
|---|---|---|
| *B32B 27/18* | (2006.01) | |
| *B32B 7/12* | (2006.01) | |
| *B32B 27/32* | (2006.01) | |
| *B32B 27/08* | (2006.01) | |
| *B32B 37/12* | (2006.01) | |

(52) U.S. Cl.
CPC ............... *B32B 27/18* (2013.01); *B32B 7/12* (2013.01); *B32B 27/08* (2013.01); *B32B 27/32* (2013.01);
(Continued)

(58) Field of Classification Search
CPC ........... B32B 27/18; B32B 7/12; B32B 27/32; B32B 27/08; B32B 37/12;
(Continued)

(56) References Cited

U.S. PATENT DOCUMENTS

| | | |
|---|---|---|
| 5,399,603 A | 3/1995 | Sloan et al. |
| 6,593,007 B2 | 7/2003 | Donaldson et al. |
(Continued)

FOREIGN PATENT DOCUMENTS

EP    3173231    5/2017

OTHER PUBLICATIONS

Cussler, EL, "Diffusion Barriers", Diffusion Fundamentals 6 (2007) 72.1-72.12.*

(Continued)

*Primary Examiner* — Jeffry H Aftergut
(74) *Attorney, Agent, or Firm* — Polsinelli, PC

(57) ABSTRACT

A barrier film substrate includes a first layer including a polymer and a transition metal having chemical sequestering properties such that, upon exposure of the barrier film substrate to one or more chemical vapors, a reaction occurs between the transition metal and the one or more chemical vapors. A second layer is aligned with the first layer. The second layer includes a polymer having impeding properties such that, upon the exposure of the barrier film substrate to the one or more of the chemical vapors, the second layer substantially blocks passage of the one or more of the chemical vapors through the barrier film substrate. One or more additional layers is aligned with at least one of the first layer or the second layer to provide structural support for the first layer and the second layer.

9 Claims, 3 Drawing Sheets

(52) U.S. Cl.
CPC ........... *B32B 37/12* (2013.01); *B32B 2250/24* (2013.01); *B32B 2307/7242* (2013.01); *B32B 2323/043* (2013.01)

(58) Field of Classification Search
CPC ...... B32B 2307/7242; B32B 2323/043; B32B 2250/24; B32B 27/306; B32B 27/34; B32B 2255/205; B32B 2419/00; B32B 27/36; B32B 2255/10
See application file for complete search history.

(56) References Cited

U.S. PATENT DOCUMENTS

| | | |
|---|---|---|
| 8,449,982 B2 | 5/2013 | Arai et al. |
| 9,694,344 B2 * | 7/2017 | Song .................. B01J 20/28035 |
| 2014/0370246 A1 * | 12/2014 | Hurt ......................... B05D 5/00 428/189 |
| 2016/0243525 A1 | 8/2016 | Song et al. |

OTHER PUBLICATIONS

Shimotori, T, et al, "Hig-Density Polyethylene Membrane Containing Fe0 as a Containment Barrier", Journal of Environmental Engineering, Jul. 2006, pp. 803-809.*

International Preliminary Report on Patentability dated Feb. 27, 2020, issued in corresponding International Application No. PCT/US2018/046761, filed Aug. 14, 2018, 6 pages.

The PCT Search Report and Written Opinion dated Nov. 29, 2018 for PCT Application No. PCT/US2018/046761, 7 pages.

* cited by examiner

BARRIER FILM SUBSTRATE, METHOD OF MAKING SAME, AND USE THEREOF

CROSS REFERENCE TO RELATED PATENT APPLICATION

This application claims priority to U.S. Provisional Patent Application No. 62/545,416, filed Aug. 14, 2017, entitled "BARRIER FILM SUBSTRATE, METHOD OF MAKING SAME, AND USE THEREOF," the entire contents of which is incorporated herein by reference.

BACKGROUND

Volatile organic compounds (VOCs) are organic chemicals that have a high vapor pressure at ordinary room temperature. The amount of VOCs detected in a building structure are generally higher than in the outdoor environment. While a higher concentration of VOCs in a building structure may be caused in part by inadequate ventilation as well as multiple sources of VOC emission within the building structure, it is also known that VOCs may be released from soil into a structure via the foundation. Since some VOCs are known to be hazardous to human health, it is desirable to minimize the amount of VOCs that pass through the foundation so as to minimize human exposure to the VOCs. It is noted that the term "VOCs" may include VVOCs (very volatile organic compounds) and SVOCs (semi-volatile organic compounds). Furthermore, water vapor and gases such as methane and radon may also be harmful either to the building structure itself, and/or the occupants therein.

Accordingly, it is desirable to prevent passage of VOCs, gases, and water vapor into a structure. Indeed, this desire applies to not only passage through the foundation of a structure, but through any below-grade wall of a building structure. In addition to protecting buildings, it may be desirable to further minimize the ability of a VOC and/or other gases or moisture to pass beyond contaminated zones of a building structure, soil, ground water, or air. As such, barrier film sheets have been applied over the soil and beneath a concrete foundation, and in other places to minimize the transmission of the above-mentioned harmful elements. However, current barrier films are limited in effectiveness.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a vapor intrusion barrier to attenuate and/or slow down the transmission of hazardous substances, pollutants, and/or contaminants, including but not limited to: VOCs, methane, radon, and water vapor. In particular, this disclosure describes a vapor barrier film substrate that combines an impeding feature with a filtering/sequestering feature. Furthermore, the barrier film substrate described herein has widespread applicability ranging from "below-slab" uses to all other phases of site development and clean-up, including for use in below-grade walls between the outdoors and the indoors. More specifically, a non-limiting example of the disclosure herein is a barrier film substrate for use as a barrier installed within or around a building envelope, or at development or cleanup sites, to minimize transmission of chemical vapors including volatile organic compounds ("VOC"), methane, radon, and water. For the purposes of this application, the "building envelope" may include all areas adjacent to and within a perimeter of a building structure.

Generally, vapor barriers simply try to impede intrusion of vapors and/or moisture. While such an approach may be somewhat effective in many instances, the instant disclosure describes an approach of impeding intrusion of the chemicals and filtering/sequestering of the chemicals attempting to transfer through the barrier film substrate. That is, a layer of material having impeding properties may be included to be paired with a layer of material having filtering/sequestering properties. Other layers may be included as support for structure or tie layers depending on the binding properties of the one or more different materials used in the variety of layers in the vapor barrier film substrate.

Illustrative Embodiments of a Barrier Film Substrate

Figure 1:
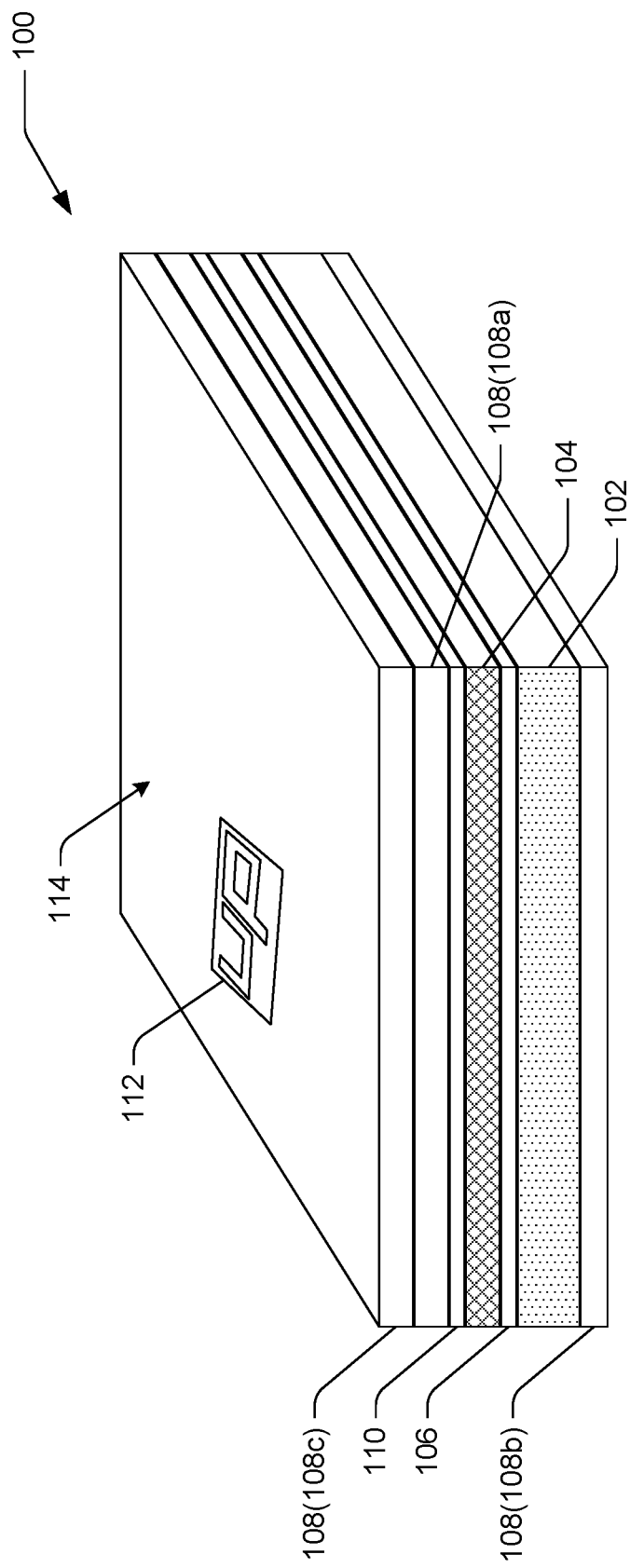
FIG. 1 illustrates a sectional view of a barrier film according to an embodiment of this application.

In FIG. 1, a perspective sectional view of an embodiment of a barrier film substrate 100 is depicted. As indicated above, barrier film substrate 100 may include both of a filtering/sequestering feature and an impeding feature by implementing materials having those properties. For example, in an embodiment, barrier film substrate 100 may include a first layer 102 including a polymer and a transition metal having chemical filtering/sequestering properties such that, upon exposure of barrier film substrate 100 to one or more of the chemical vapors, a reaction may occur between the transition metal behaving as a reactive agent and the one or more chemical vapors, whereby the one or more chemical vapors is broken down and filtered into chemical sub-components, also known as breakdown products. A result of the reaction may be that the chemical sub-components are either less easily passed through the impeding layer (discussed below) and/or broken down into less toxic/harmful, or even harmless, matter. Moreover, as the transition metal reacts with various passing chemicals, the density of the impeding layer may increase, thereby creating a more tortuous path as a better barrier to oncoming VOCs, gases, and/or water vapor.

With respect to the transition metal mixed with the polymer of first layer 102, while the list of known transition metals is significant, several transition metals are considered unstable with short useful life or would not have the reactivity required, and thus may not be suitable at this time to include in first layer 102. However, the following list of transition metals that may be implemented in first layer 102 includes, but is not limited to: titanium, chromium, manganese, iron, cobalt, nickel, copper, zinc, zirconium, molybdenum, silver, cadmium, hafnium, tungsten, and palladium. Moreover, in an example using copper as the transition metal mixed with the polymer for first layer 102, a percent amount of copper by mass of first layer 102 may range from about 2% to about 28%, or from about 5% to about 23%, or from about 10% to about 20%, for example. Note, the amount of the transition metal used may vary depending on the method of forming first layer 102.

Alternatively, in an embodiment, first layer 102 may be formed as a metalized film. As a metalized film, first layer 102 may be added to barrier film substrate 100 in one of many ways, including via metal vapor deposition, via a metal film laminate, etc. Example materials include the transition metals, as discussed above. Properties of a metalized film first layer 102 may vary somewhat from those discussed herein with respect to a first layer made of a polymer and a transition metal. However, a metalized film first layer 102 still has filtering/sequestering properties.

Barrier film substrate 100 also includes a second layer 104 that is aligned with first layer 102. Second layer 104 includes a polymer of a chemical composition that provides impeding properties such that, upon the exposure of barrier film substrate 100 to the one or more of the chemical vapors, second layer 104 substantially impedes passage of the one or more of the chemical vapors through barrier film substrate 100. Though there may be external factors that affect the efficacy of the impeding feature, when used in the same environmental conditions, the efficacy of a barrier film substrate according to the instant disclosure exceeds by an order of magnitude or greater the efficacy of a conventional polyethylene barrier film substrate For example, depending on environmental site-specific conditions and the specific chemical in question, second layer 104 may impede passage of the one or more of the chemical vapors through barrier film substrate 100 within a range of 50 to 1,000 times more effectively than a conventional polyethylene barrier film. As such, when barrier film substrate 100 is implemented having second layer 104 above first layer 102 with respect to a surface on which barrier film substrate 100 is used, the chemical vapors continue to react with and be filtered by first layer 102 due to second layer 104 impeding passage (at least initially) of the one or more chemical vapors. That is, at least a part of the reaction that occurs between the chemical vapors and first layer 102 may be time-based to the extent that the effectiveness of breaking down and filtering/sequestering more of the chemical vapors increases along with the amount of time that the chemical vapors are blocked and thus forced in contact with first layer 102.

As for the material used in second layer 104, a list of materials having impeding properties suitable for impeding the chemical vapors and gases expected during use includes, but is not limited to: nylon, polyester, ethylene vinyl alcohol ("EVOH"), etc. Depending on the strength of the impeding properties of the chosen material, a thickness of second layer 104 may vary to achieve effective impeding. Furthermore, depending on the formation properties of the chosen material and the desired thickness, second layer 104 may be formed via blowing with first layer 102 simultaneously, or cast and then laminated with first layer 102 subsequent to being cast, or may be formed by a combination of various procedures, (e.g., blown, cast, or profile extruded and then laminated).

In an embodiment, a bonding layer 106 may be used to bond first layer 102 to second layer 104. This may occur, for example, where the respective materials of first layer 102 and second layer 104 are otherwise incompatible for bonding to each other, where a manufacturer is unable to blow enough of the layers simultaneously, where the manufacturer is unable to blow the film to a sufficient thickness so as to require subsequent bonding, etc. Thus, when barrier film substrate 100 is blown, the bonding layer 106 may be a tie layer of a material that is suitable for bonding to both first layer 102 and second layer 104. Likewise, when barrier film substrate 100 is cast and laminated, the bonding layer 106 may be an adhesive layer of an adhesive material that is suitable for bonding to both first layer 102 and second layer 104. Whether bonding layer 106 is a tie layer or an adhesive layer, the material may include other plastic materials, such as, for example, a low density polyethylene ("LDPE"). As indicated below, a bonding layer may be implemented to assist in bonding any two layers of the barrier film substrate that would otherwise be immediately adjacent.

Additionally, in a situation where barrier film substrate 100, including first layer 102 and second layer 104, exhibits undesirable properties, (e.g., curling, delamination, other separation issues, instability, other problematic concerns related to strength or durability, etc.), one or more additional layers 108 may be formed to or with first layer 102 and second layer 104, regardless of whether bonding layer 106 is included. Moreover, in a situation where barrier film substrate 100, including first layer 102 and second layer 104, does not exhibit undesirable properties, one or more other layer 108 may still be formed to or with first layer 102 and second layer 104, for example to enhance barrier film substrate 100 with increased or additional desirable properties. Thus, in an embodiment, a third layer 108 (108a), a fourth layer 108 (108b), and/or a fifth layer 108 (108c) may be included. Indeed, a barrier film substrate may include more than five layers. In an embodiment, additional layers 108 may be added to enhance structural support aspects including structural support during manufacture and/or for installation and in-service purposes, such as increased physical strength to resist punctures and improve tensile strength of barrier film substrate 100.

As depicted in FIG. 1, in the event third layer 108 (108a) is included, and disposed on a side of second layer 104 opposite the side against which first layer 102 is disposed, another bonding layer 110 may be formed with or laminated between second layer 104 and third layer 108 (108a). Bonding layer 110 may be included, for example, when the respective materials of second layer 104 and third layer 108 (108a) are not sufficiently compatible for bonding directly to each other. Thus, bonding layer 110 may be a tie layer or an adhesive layer as described with respect to bonding layer 106 above.

In the event that fourth layer 108 (108b) is included, fourth layer 108 (108b) may be disposed adjacent a side of first layer 102 opposite the side against which second layer 104 is disposed. As depicted in FIG. 1, fourth layer 108 (108b) may be included and formed with or otherwise bonded directly to first layer 102. Similarly, in the event that fifth layer 108 (108c) is included, fifth layer 108 (108c) may be disposed adjacent a side of third layer 108 (108a) opposite the side against which second layer 104 is disposed. As depicted in FIG. 1, fifth layer 108 (108c) may be included and formed with or otherwise bonded directly to third layer 108 (108a).

Material selection for additional layers 108 may include, but is not limited to: LDPE, linear low density polyethylene ("LLDPE"), and/or high density polyethylene ("HDPE"), for example. Inasmuch as HDPE has better vapor barrier properties than either LDPE or LLDPE, in an embodiment, HDPE may be selected for use as fourth layer 108 (108b). Thus, fourth layer 108 (108b) may be an external layer disposed against the side of first layer 102, which may be placed against the earth or other surface when in use to act as a first line of defense to minimize chemical vapor and moisture transmission. Regardless, fourth layer 108 (108b), when added, may be formed of materials other than HDPE, such as LLDPE, for example. Additionally, in an embodiment, third layer 108 (108a) and/or fifth layer 108 (108c) may include LDPE, LLDPE, or a blend thereof, for example. Nevertheless, as with fourth layer 108 (108b), third layer 108 (108a) and fifth layer 108 (108c)), when added, may be formed of materials other than LDPE, LLDPE, or a blend thereof, such as HDPE, for example.

Though not depicted explicitly, in an embodiment, fewer than, or alternatively, more than all of other layers 108 (108a-c) may be included in barrier film substrate 100. When forming barrier film substrate 100, a factor, in addition to others discussed above, that may influence the inclusion or one or more of other layers 108 (108a-c) may be an effort to balance the film structure by distributing like mass (densities) on each side of the film's thickness cross section. This factor and others may be further influenced by the manner of formation, including but not limited to, blowing and casting.

In forming barrier film substrate 100, factors involved in the decision of which method of formation to use may include: the densities and thickness of the respective layers; the bonding properties of the respective layers; and the stability of the film structure during manufacture.

With regard to a factor that may affect the method of formation, as indicated above, the following thickness values and density values are approximate, and are provided by way of example. Further, each layer may vary in thickness and density according to a variety of circumstances. Accordingly, in an example embodiment: a barrier film substrate 100 may have an overall thickness ranging from about 5 mils to about 50 mils, or from about 10 mils to about 40 mils, or from about 20 mils to about 30 mils; a thickness of a first layer 102 having filtering/sequestering properties may range from about 0.1 mil to about 10 mils, or about 1 mil to about 7 mils, or about 3 mils to about 5 mils; a thickness of a second layer 104 having impeding properties may range from about 0.1 mil to about 3 mils, or about 0.5 mil to about 2 mils, or about 1 mil to about 1.5 mils; a thickness of an additional layer 108 (e.g., a polyethylene based layer) may range from about 2 mils to about 15 mils, or about 5 mils to about 12 mils, or about 5 mils to about 7 mils; and a thickness of a bonding layer 106 (e.g., a tie-layer) may range from about 1 mil to about 4 mils, or about 1.5 mils to about 3.5 mils, or about 2 mils to about 3 mils. Moreover, in a second layer 104 having impeding properties, and including EVOH, the ethylene content may range from about 24 to about 44 Mol %, or about 30% to about 40%, or about 33% to about 36%, for example. Additionally, a density of an additional layer 108 may range from about 0.911 g/cm$^3$ to about 0.965 g/cm$^3$.

As described thus far, in an embodiment where barrier film substrate 100 contains a single filtering/sequestering layer (e.g., first layer 102) and a single impeding layer (e.g., second layer 104), barrier film substrate 100 is asymmetrical in cross-section. However, it is contemplated that barrier film substrate 100 need not be asymmetrical. That is, in an embodiment, a plurality of layers may be aligned so as to form a substrate having symmetry through a plane of a layer of the substrate (not shown). For example, the same series of layers on a first side of the filtering/sequestering layer or the impeding layer may be added in reverse on a second side of the filtering/sequestering layer or the impeding layer (i.e., Layer A, Layer B, Layer C, Layer B, Layer A; where Layer C is the filtering/sequestering layer and Layer B is the impeding layer, or vice versa). In such an embodiment where the barrier film substrate is symmetrical with respect to layering, deciding which side of the barrier film substrate to place against the surface in implementation is of no consequence. However, in an asymmetrical embodiment, as shown in FIG. 1, the efficacy of the barrier film substrate 100 may vary depending on which side is facing the source of contamination due to chemical and vapor transmission and which side faces out in use. In such a situation where the orientation of barrier film substrate 100 is consequential, an orientation indication mark 112 may be included on one or both sides of barrier film substrate 100 (shown on top of barrier film substrate 100 as "UP"). Note, indication mark 112 is not limited to "UP." Rather, indication mark 112 may include numbers, words, sentences, symbols, images, a different shade of coloration on a side, etc. Likewise, an indication mark placed on the bottom (not shown) of barrier film substrate 100 may be different or the same as indication mark 112, including but not limited to, numbers, words, sentences, symbols, images, a different shade of coloration on a side, etc.

As previously mentioned, in a situation where barrier film substrate 100 is implemented such that second layer 104 is oriented above first layer 102, indicator mark 112 may be disposed on an external surface 114 of barrier film substrate 100 above second layer 104 so that a user knows to implement barrier film substrate 100 with external surface 114 facing out away from the surface of implementation, thereby increasing the efficacy of barrier film substrate 100.

Figure 2A:
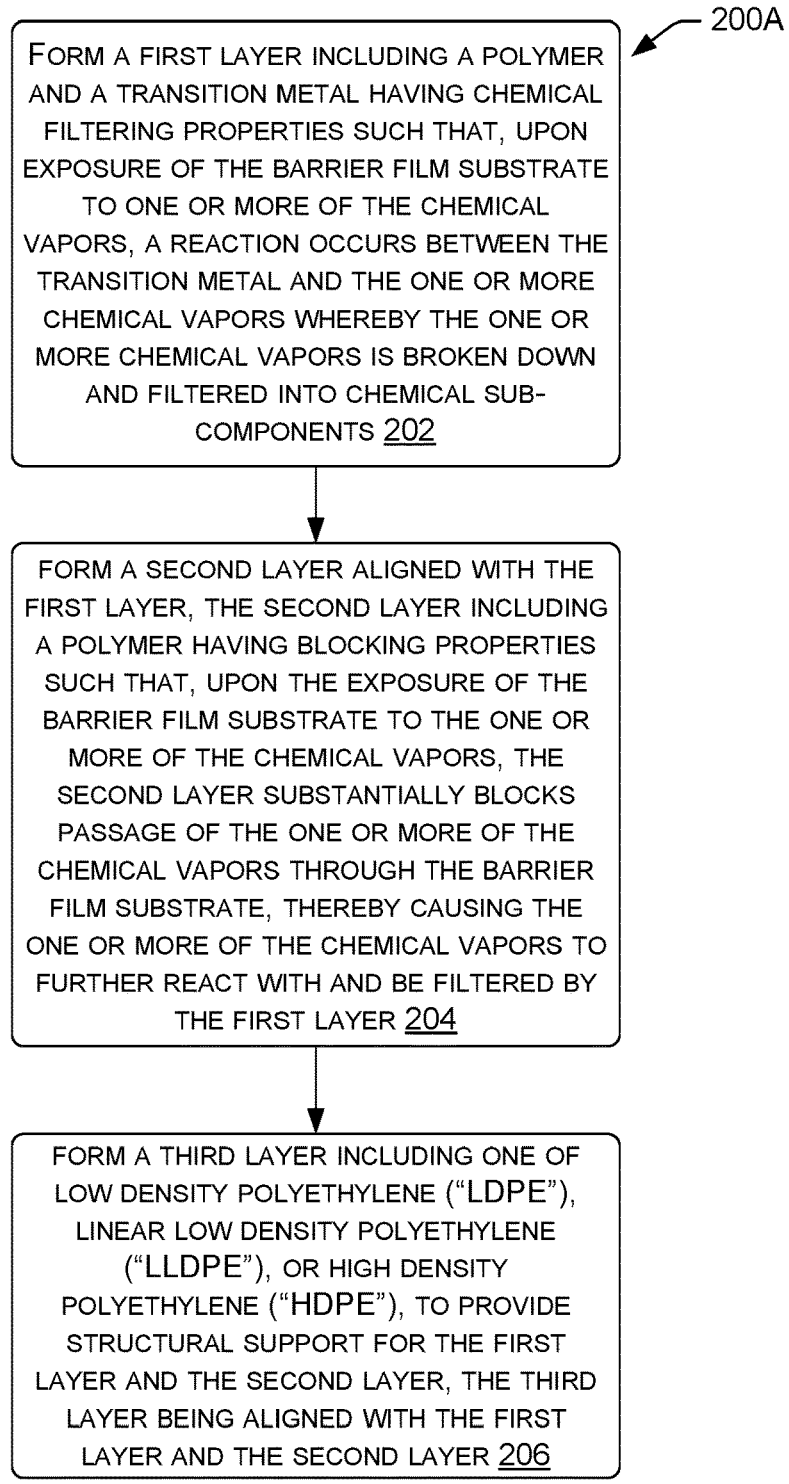
FIG. 2A illustrates a method of forming a barrier film according to an embodiment of this application.

In FIG. 2A, a method 200 is depicted including steps for formation of a barrier film substrate according to an embodiment of the instant disclosure. While the steps of method 200A are depicted in a flow schematic, the steps may be executed in a different order than what is shown without limitation. In step 202, a first layer may be formed. The first layer may include a polymer and a transition metal having chemical filtering/sequestering properties such that, upon exposure of the formed barrier film substrate to one or more of the chemical vapors, a reaction occurs between the transition metal and the one or more chemical vapors, whereby the one or more chemical vapors is broken down and filtered into chemical sub-components. In step 204, a second layer may be aligned and formed with the first layer. The second layer may include a polymer having impeding properties such that, upon the exposure of the barrier film substrate to the one or more of the chemical vapors, the second layer substantially blocks passage of the one or more of the chemical vapors through the barrier film substrate, thereby causing the one or more of the chemical vapors to further react with and be filtered by the first layer. Additionally, method 200A may include a step 206, in which a third layer including one of low density polyethylene ("LDPE"), linear low density polyethylene ("LLDPE"), or high density polyethylene ("HDPE") may be formed. The third layer may provide structural support for the first layer and the second layer, and the third layer may be aligned with the first layer and the second layer.

As stated above, the barrier film substrate having the filtering/sequestering and impeding layers may be formed by one of several processes including, but not limited to: profile extrusion, cast lamination, inline lamination, blown film, or cast film.

Figure 2B:
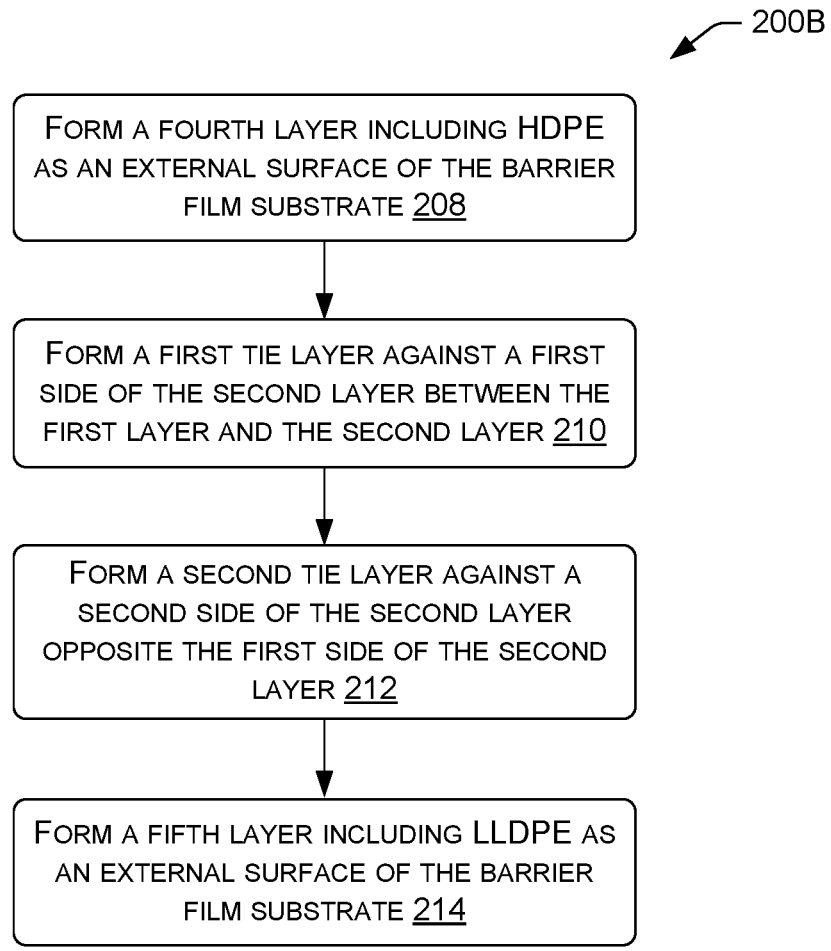
FIG. 2B illustrates additional method steps of forming a barrier film according to an embodiment of this application.

In FIG. 2B, additional steps of a method 200B may be executed in addition to steps of method 200A. For example, in an embodiment, step 208 may be implemented in which a fourth layer is formed. The fourth layer may include HDPE as an external surface of the barrier film substrate. In step 210, a first tie layer may be formed against a first side of the second layer between the first layer and the second layer (formed in steps 202 and 204). Similarly, in step 212, a second tie layer may be formed against a second side of the second layer opposite the first side of the second layer. Additionally, a step 214 may be executed, in which a fifth layer including LLDPE is formed as an external surface of the barrier film substrate. As indicated above, additional layers may be added in further steps, or, fewer layers may be included, and thus, it is contemplated that not all steps may be executed.

Example Clauses

A: A barrier film substrate for use as a barrier installed within or around a building envelope, or at development or cleanup sites, to minimize transmission of chemical vapors including volatile organic compounds ("VOC"), methane, radon, and water, the barrier film substrate comprising: a first layer including a polymer and a transition metal having chemical sequestering properties such that, upon exposure of the barrier film substrate to one or more of the chemical vapors, a reaction occurs between the transition metal and the one or more chemical vapors whereby the one or more chemical vapors is broken down and filtered into chemical sub-components; a second layer aligned with the first layer, the second layer including a polymer having impeding properties such that, upon the exposure of the barrier film substrate to the one or more of the chemical vapors, the second layer substantially blocks passage of the one or more of the chemical vapors through the barrier film substrate, thereby causing the one or more of the chemical vapors to further react with and be filtered by the first layer; and one or more additional layers aligned with at least one of the first layer or the second layer to provide structural support for the first layer and the second layer.

B: The barrier film substrate according to paragraph A, wherein the transition metal includes at least one of copper, zinc, iron, nickel, or silver.

C: The barrier film substrate according to any of paragraphs A-B, wherein the polymer of the second layer is one of ethylene vinyl alcohol "(EVOH"), nylon, or polyester.

D: The barrier film substrate according to any of paragraphs A-C, wherein the film is formed as a blown film.

E: The barrier film substrate according to any of paragraphs A-D, wherein the one or more additional layers include at least one of: a third layer aligned with the first layer and the second layer, the third layer including a linear low density polyethylene ("LLDPE"), or a fourth layer aligned with the first layer and the second layer, the fourth layer including a high density polyethylene ("HDPE").

F: The barrier film substrate according to any of paragraphs A-E, further comprising a tie layer disposed between the first layer and the second layer.

G: The barrier film substrate according to any of paragraphs A-F, further comprising an adhesive layer disposed between the first layer and the second layer.

H: A barrier film substrate for use as a barrier installed within or around a building envelope, or at development or cleanup sites, the barrier film substrate comprising: a first layer including a polymer and a transition metal having chemical sequestering properties such that, upon exposure of the barrier film substrate to one or more of the chemical vapors, a reaction occurs between the transition metal and the one or more chemical vapors whereby the one or more chemical vapors is broken down and filtered into chemical sub-components; a second layer aligned with the first layer, the second layer including ethylene vinyl alcohol ("EVOH"), and upon the exposure of the barrier film substrate to the one or more of the chemical vapors, the second layer substantially blocks passage of the one or more of the chemical vapors through the barrier film substrate, thereby causing the one or more of the chemical vapors to further react with and be filtered by the first layer; and a tie layer disposed between the first layer and the second layer to bind the polymer and the transition metal with the EVOH.

I: The barrier film substrate according to paragraph H, wherein the transition metal includes at least one of copper, zinc, iron, nickel, or silver.

J: The barrier film substrate according to any of paragraphs H-I, wherein an amount of the transition metal included in the polymer of the first layer ranges between about 2% to about 28% [of a mass of the first layer].

K: The barrier film substrate according to any of paragraphs H-J, further comprising: a third layer aligned with the first layer and the second layer, the third layer including a linear low density polyethylene ("LLDPE"); and a fourth layer aligned with the first layer and the second layer, the fourth layer including a high density polyethylene ("HDPE").

L: The barrier film substrate according to any of paragraphs H-K, wherein the tie layer is disposed against a first side of the second layer, and the tie layer is a first tie layer, wherein the third layer is disposed adjacent a second side of the second layer, and wherein the barrier film substrate further comprises: a second tie layer disposed between the second side of the second layer and the third layer.

M: The barrier film substrate according to any of paragraphs H-L, wherein the tie layer is disposed against a first side of the second layer, and the tie layer is a first tie layer, wherein the third layer is disposed against a side of the first layer opposite the first tie layer and the second layer, and wherein the barrier film substrate further comprises: a fifth layer including low density polyethylene ("LDPE"); and a second tie layer disposed between the second side of the second layer and the fifth layer.

N: The barrier film substrate according to any of paragraphs H-M, further comprising at least one of: a first indication mark indicative of a surface placement side, the indication mark being disposed so as to be visible from a perspective of looking at a first external surface of the barrier film substrate that is closer to the first layer than to the second layer, or a second indication mark indicative of a face-out placement side, the indication mark being disposed so as to be visible from a perspective of looking at a second external surface of the barrier film substrate that is closer to the second layer than to the first layer.

O: A method of forming, via a blowing process or a casting process, a barrier film substrate for use as a barrier installed within or around a building envelope, or at development or cleanup sites, that minimizes transmission of chemical vapors including volatile organic compounds ("VOC"), methane, radon, and water vapor, the method comprising acts of: forming a first layer including a polymer and a transition metal having chemical sequestering properties such that, upon exposure of the barrier film substrate to one or more of the chemical vapors, a reaction occurs between the transition metal and the one or more chemical vapors whereby the one or more chemical vapors is broken down and filtered into chemical sub-components; forming a second layer aligned with the first layer, the second layer including a polymer having impeding properties such that, upon the exposure of the barrier film substrate to the one or more of the chemical vapors, the second layer substantially blocks passage of the one or more of the chemical vapors through the barrier film substrate, thereby causing the one or more of the chemical vapors to further react with and be filtered by the first layer; and forming a third layer including one of low density polyethylene ("LDPE"), linear low density polyethylene ("LLDPE"), or high density polyethylene ("HDPE"), to provide structural support for the first layer and the second layer, the third layer being aligned with the first layer and the second layer.

P: The method according to paragraph O, wherein the third layer includes LLDPE, and the third layer is formed as a first external surface of the barrier film substrate, and wherein the method further comprises an act of forming a fourth layer including HDPE as a second external surface of the barrier film substrate.

Q: The method according to any of paragraphs O-P, wherein the transition metal in the first layer is copper, and the second layer includes ethylene vinyl alcohol ("EVOH") or nylon.

R: The method according to any of paragraphs O-Q, further comprising acts of: forming a first tie layer against a first side of the second layer between the first layer and the second layer, and forming a second tie layer against a second side of the second layer opposite the first side of the second layer.

S: The method according to any of paragraphs O-R, wherein the third layer includes one of LLDPE or HDPE, and the third layer is formed against the first layer.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A method of using a barrier film substrate, the method comprising:
   installing the barrier film substrate within or around a building envelope, or at development or cleanup sites, to minimize transmission of chemical vapors including volatile organic compounds ("VOC"), methane, radon, and water, the barrier film substrate including:
      a first layer including a polymer and a transition metal having chemical sequestering properties such that, upon exposure of the barrier film substrate to one or more of the chemical vapors, a reaction occurs between the transition metal and the one or more chemical vapors whereby the one or more chemical vapors is broken down into chemical sub-components some of which can be filtered by the first layer, wherein the transition metal is copper;
      a second layer aligned with the first layer, the second layer including a polymer having impeding properties such that, upon the exposure of the barrier film substrate to the one or more of the chemical vapors, the second layer substantially blocks passage of the one or more of the chemical vapors through the barrier film substrate, thereby causing the one or more of the chemical vapors to further react with and be filtered by the first layer; and
      one or more additional layers aligned with at least one of the first layer or the second layer to provide structural support for the first layer and the second layer,
      wherein the barrier film substrate is oriented such that the first layer is closest to the chemical vapors.

2. The method according to claim 1, wherein the polymer of the second layer is one of ethylene vinyl alcohol "(EVOH"), nylon, or polyester.

3. The method according to claim 1, wherein the film is formed as a blown film.

4. The method according to claim 1, wherein the one or more additional layers include at least one of:
   a third layer aligned with the first layer and the second layer, the third layer including a linear low density polyethylene ("LLDPE"), a high density polyethylene ("HDPE"), or a low density polyethylene ("LDPE"), and
   a fourth layer aligned with the first layer and the second layer, the fourth layer including LLDPE, HDPE, or LDPE.

5. The method according to claim 1, further comprising a bonding layer disposed between the first layer and the second layer.

6. The method according to claim 1, further comprising an adhesive layer disposed between the first layer and the second layer.

7. The method according to claim 4, further comprising a bonding layer disposed between the second layer and the third layer.

8. The method according to claim 4, wherein the one or more additional layers includes a fifth layer aligned with the first layer and the second layer, the fifth layer including LDPE, LLDPE, or HDPE.

9. The method according to claim 1, wherein the amount of the transition metal included in the first layer is in the range between about 2% and about 28% by mass of the first layer.

* * * * *